United States Patent
Hendzel

(10) Patent No.: US 6,944,994 B2
(45) Date of Patent: Sep. 20, 2005

(54) ANCHORING BRACKET

(75) Inventor: Louis J. Hendzel, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 97 days.

(21) Appl. No.: 10/247,010

(22) Filed: Sep. 19, 2002

(65) Prior Publication Data

US 2004/0055230 A1 Mar. 25, 2004

(51) Int. Cl.[7] .............................................. E04B 1/38
(52) U.S. Cl. ........................ 52/127.2; 52/298; 52/698; 248/500; 403/384
(58) Field of Search .............................. 52/127.2, 298, 52/698, 127.1, 127.5–7, 127.8, 127.9, 299, 292, 699, 701, 702, 703, 704, 706, 708, 710, 713, 714, 745.21; 248/500, 503, 507–508; 403/384, 388

(56) References Cited

U.S. PATENT DOCUMENTS

| | | | | |
|---|---|---|---|---|
| 610,529 A | * | 9/1898 | Gilbert | |
| 3,490,760 A | * | 1/1970 | Nill | |
| 4,309,018 A | * | 1/1982 | Reiss | 248/503 |
| 4,681,290 A | * | 7/1987 | Crosbie | 248/225.31 |
| 5,022,623 A | * | 6/1991 | Laarman | 248/239.9 |
| 5,243,805 A | * | 9/1993 | Fricker | 52/698 |
| 5,317,844 A | | 6/1994 | Legler | |
| 5,619,834 A | * | 4/1997 | Chenn | 52/509 |
| 5,670,076 A | * | 9/1997 | Leek | 249/53 M |
| 5,729,951 A | * | 3/1998 | Frohlich | 52/698 |
| 6,029,407 A | * | 2/2000 | Schillero, Jr. | 52/127.2 |
| 6,050,034 A | | 4/2000 | Krinner | |
| 6,463,710 B1 | * | 10/2002 | Barnhart | 52/698 |

* cited by examiner

*Primary Examiner*—Jeanette E. Chapman
(74) *Attorney, Agent, or Firm*—Louis J. Franco; Leland D. Schultz; Patrick M. Hogan

(57) ABSTRACT

An anchoring bracket is adapted for applying an anchoring force to a mount having a support stud depending from a force-distributing pad including a contact surface defined by a perimeter and adapted for supporting engagement with a support surface and an anchoring-force bearing surface opposite the contact surface. The bracket has an anchoring-force-exerting surface adapted for force-exerting engagement with the anchoring-force bearing surface of the mount and further includes at least one elongated shank which, when the bracket is oriented for anchoring, extends outside the mount-pad perimeter. Depending from at least one shank is a heel adapted for force-exerting engagement with the support surface outside the mount-pad perimeter. Situated between the anchoring-force-exerting surface and the heel is an anchoring-force application region of the shank. A support-surface-directed force applied to the anchoring-force application region is distributed to the heel and the anchoring-force-exerting surface, thereby urging the mount toward the support surface.

8 Claims, 16 Drawing Sheets

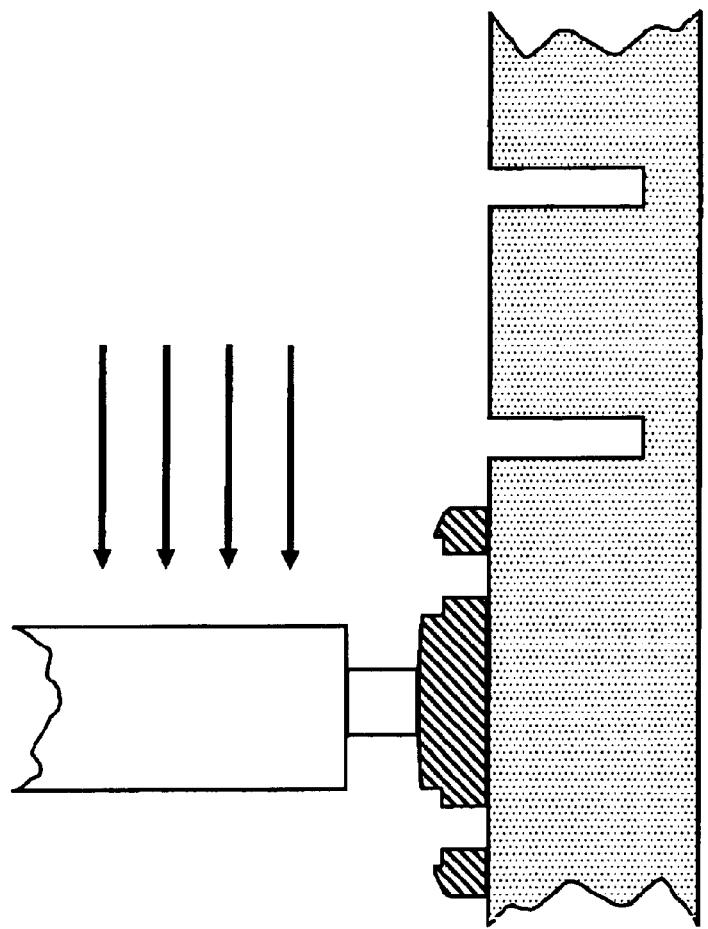
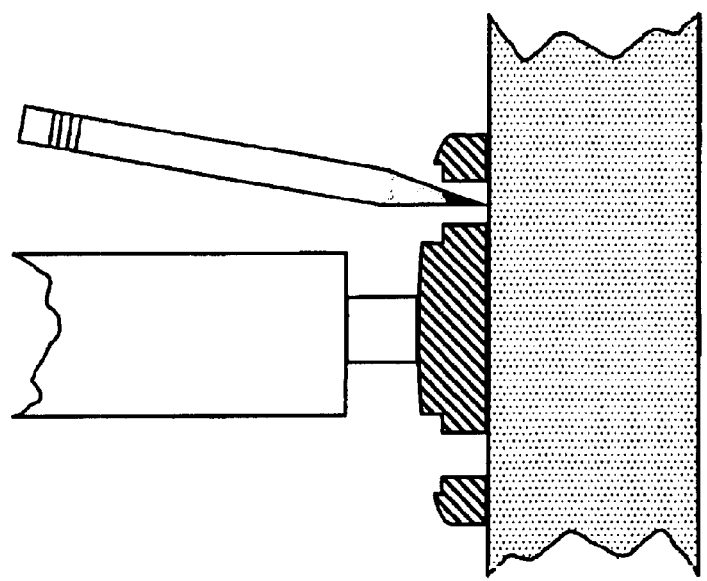
FIG. 1B (Background)
FIG. 1A (Background)

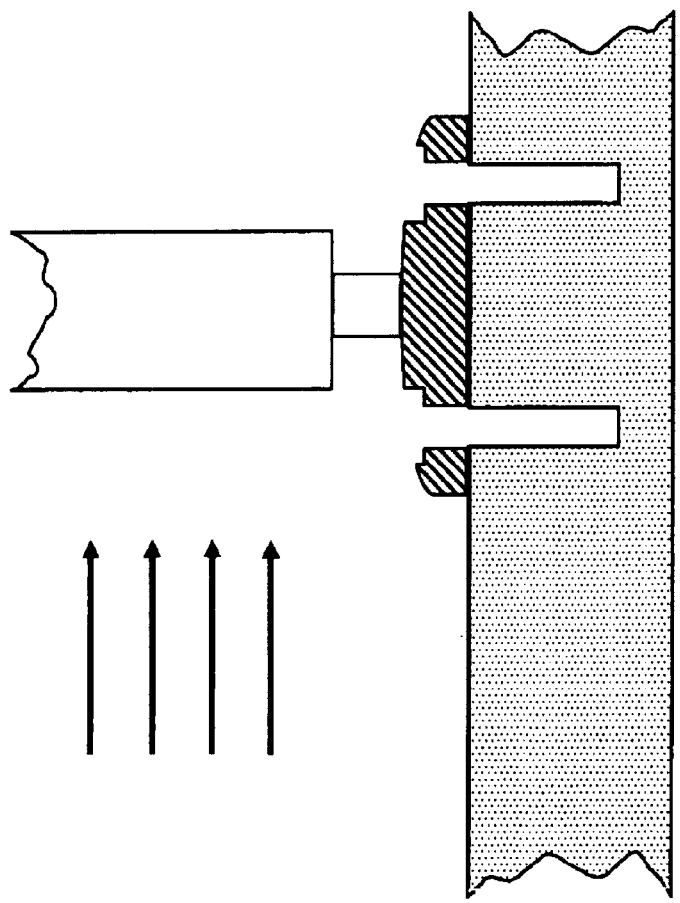
FIG. 1C (Background)
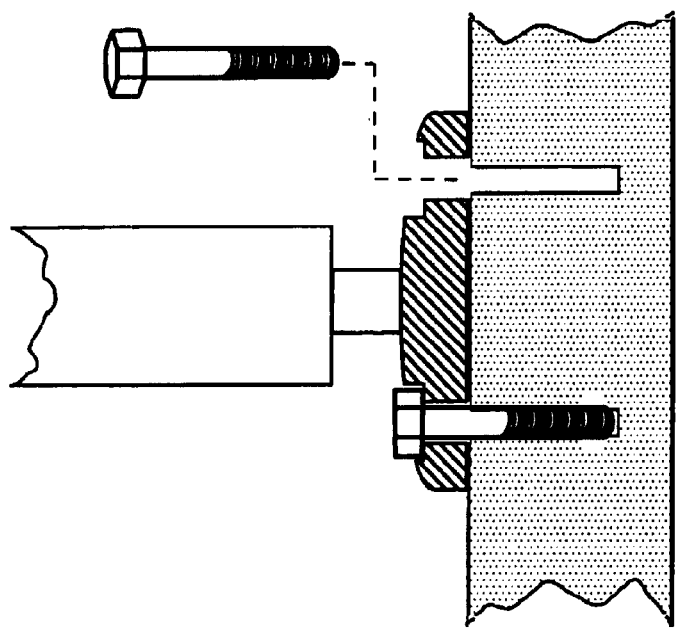
FIG. 1D (Background)

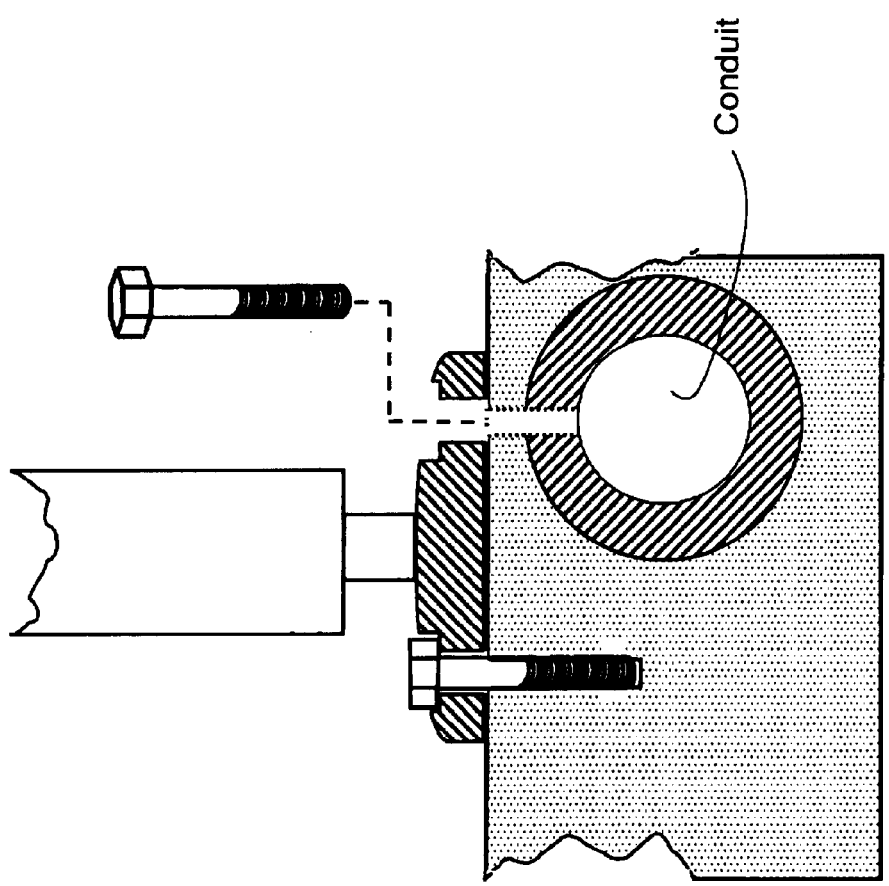
FIG. 1E (Background)

```
┌─────────────────────────────────────────────────────────────────────┐
│ A method of applying an anchoring force to a mount including a support stud
│ extending along a stud axis and depending from a force-distributing pad
│ including a first side with a contact surface defined by a perimeter and
│ adapted for supporting engagement with a support surface and a second
│ side opposite the first side and including an anchoring-force bearing surface,
│ the method comprising the steps of:                              700
└─────────────────────────────────────────────────────────────────────┘
                                  ↓
┌─────────────────────────────────────────────────────────────────────┐
│ providing an elongated rigid shank having (i) first and seconds ends, (ii) an
│ anchoring-force application region including a fastener-receiving aperture
│ located between the first and second ends and to which region an anchoring
│ force may be selectively applied, (iii) a first shank portion situated at least
│ one of (a) at the first end of the shank and (b) between the first end of the
│ shank and the anchoring-force application region and (iv) a heel depending
│ from a second shank portion more distant from the first end of the shank than
│ the anchoring-force application region;                           710
└─────────────────────────────────────────────────────────────────────┘
                                  ↓
┌─────────────────────────────────────────────────────────────────────┐
│ positioning the contact surface of the mount pad in a predetermined position
│ along the supporting surface;                                     715
└─────────────────────────────────────────────────────────────────────┘
                                  ↓
┌─────────────────────────────────────────────────────────────────────┐
│ orientating the shank such that the first shank portion is positioned for force-
│ exerting engagement with the anchoring-force bearing surface of the mount
│ pad and such that the heel is outside the perimeter of the contact surface of
│ the mount pad and the anchoring-force application region is at least partially
│ outside the perimeter of the contact surface the mount pad;      720
└─────────────────────────────────────────────────────────────────────┘
                                  ↓
┌─────────────────────────────────────────────────────────────────────┐
│ positioning the heel in a desired position along the support surface for force-
│ exerting engagement therewith;                                    725
└─────────────────────────────────────────────────────────────────────┘
                                  ↓
┌─────────────────────────────────────────────────────────────────────┐
│ applying a support-surface-directed force to the anchoring-force application
│ region of the shank thereby urging the heel and the mount pad toward the
│ supporting surface of the support structure;                      730
└─────────────────────────────────────────────────────────────────────┘
                                  ↓
┌──────────────────────────────────────────┐      FIG. 4
│ forming a fastener-receiving bore in the │
│ support structure, the bore extending one of │
│ (i) partially into the support structure and (ii) │←──┐
│ through a second surface of the support  │          │
│ structure opposite the support surface; 740 │      ┌─┴──────────────┐
└──────────────────────────────────────────┘      │ Cont'd on sheet 3 │
                  ↓                                └────────────────┘
```

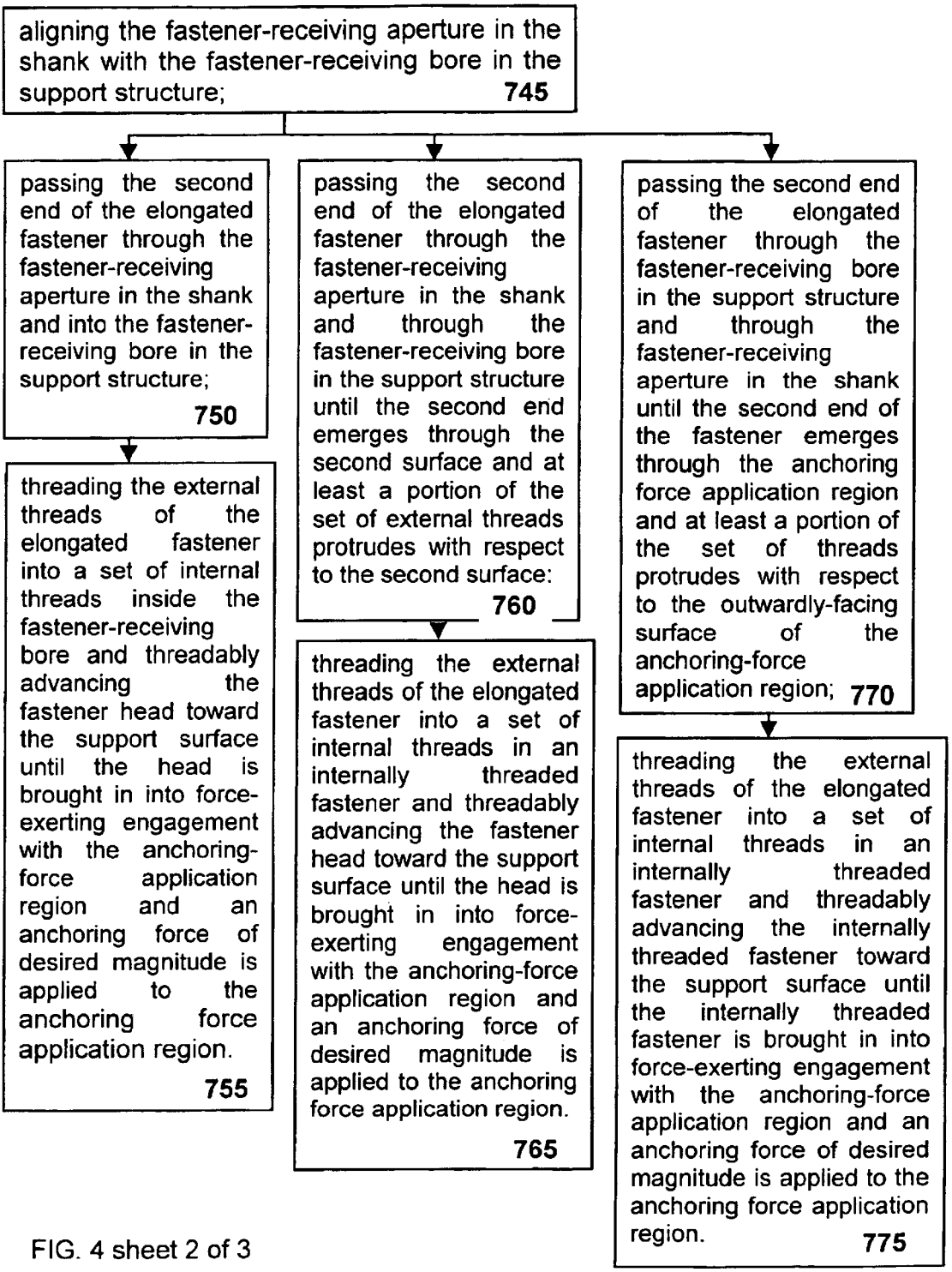
FIG. 4 sheet 2 of 3

```
                    ┌─────────────────────────────┐
                    │ Cont'd from sheet 1 step 730│
                    └─────────────────────────────┘
                                  │
                                  ▼
```

> retainably embedding the head end of an elongated fastener having a head end, a second end opposite the head end and a set of external threads extending from the second end toward the head end in the support structure such that at least a portion of the set of threads protrudes out of the support surface; and   780

> introducing the elongated fastener into the fastener-receiving aperture such that at least a portion of the set of external threads protrudes with respect to the outwardly-facing surface of the anchoring-force application region, threading the external threads of the elongated fastener into a set of internal threads in an internally threaded fastener and threadably advancing the internally threaded fastener toward the support surface until the internally threaded fastener is brought in into force-exerting engagement with the anchoring-force application region and an anchoring force of desired magnitude is applied to the anchoring force application region.   785

| A method of applying an anchoring force to a mount including a support stud extending along a stud axis and depending from a force-distributing pad including a first side with a contact surface defined by a perimeter and adapted for supporting engagement with a support surface and a second side opposite the first side and including an anchoring-force bearing surface, the method comprising the steps of: 800 |

| providing an elongated, rigid shank having (i) first and second ends, (ii) an anchoring-force application region located between the first and second ends, (iii) an elongated threaded rod fastener having a head end fixedly attached to the anchoring-force application region, a second end opposite the head end, and a set of external threads extending from the second end toward the head end; (iv) a first shank portion situated at least one of (a) at the first end of the shank and (b) between the first end and the anchoring-force application region and (v) a heel depending from a second shank portion more distant from the first end than the anchoring-force application region; 810 |

| positioning the contact surface of the mount in a predetermined position along the supporting surface; 815 |

| orientating the shank such that the first shank portion is positioned for force-exerting engagement with the anchoring-force bearing surface of the mount pad and such that the heel is outside the perimeter of the contact surface of the mount pad and the anchoring-force application region is at least partially outside the perimeter of the contact surface the mount pad; 820 |

| positioning the heel in a desired position along the support surface for force-exerting engagement therewith; 825 |

| forming a fastener-receiving bore in the support structure, bore being adapted to receive the threaded fastener such that the second end of the fastener protrudes beyond the second surface of the support structure; 830 |

↓ passing the second end of the fastener fixedly depending from the anchoring-force application region through the fastener-receiving bore in the support structure until the second end emerges through the second surface and at least a portion of the set of threads protrudes with respect the second surface; and    835

↓ threading the internal threads of an internally threaded fastener onto the external threads of the fixedly depending fastener until an anchoring force of desired magnitude is applied to the anchoring force application region through the threadable application of tension to the fixedly depending fastener.    840

FIG. 6

| A method of applying an anchoring force to a mount including a support stud extending along a stud axis and depending from a force-distributing pad including a first side with a contact surface defined by a perimeter and adapted for supporting engagement with a support surface and a second side opposite the first side and including an anchoring-force bearing surface, the method comprising the steps of: 900 |
|---|

| providing an anchoring bracket having (i) a base region including an anchoring-force-exerting surface adapted for selective force-exerting engagement with the anchoring-force bearing surface of the mount; (ii) at least two elongated shanks extending outwardly from the base region, each shank of a selected set of shanks having a base end, a distal end opposite the base end, an anchoring-force application region situated between the base and distal ends, and a distal shank portion more distant from the base region than the anchoring-force application region of that shank; and (iii) a heel depending from the distal shank portion of each shank of a set of shanks selected from among the plurality of shanks; 910 |
|---|

▼

| positioning the contact surface of the mount in a predetermined position along the supporting surface; 915 |
|---|

▼

| orienting the bracket such that (i) the anchoring-force-exerting surface of the base region is positioned for force-exerting engagement with the anchoring-force bearing surface of the mount pad and (ii) at last one heel is outside the perimeter of the contact surface of the mount pad and, with respect to each shank of a selected set of shanks positioned such that the heel depending from that shank is outside the perimeter, at least a portion of the anchoring-force application region of that shank is at least partially outside the perimeter of the contact surface; 920 |
|---|

▼

| positioning at least one heel of the at one heels of the bracket in a desired position for force-exerting engagement with the support surface; and 925 |
|---|

▼

| applying a support-surface-directed force to the anchoring-force application region of at least one shank from which depends a heel positioned for force-exerting engagement with the support surface thereby urging the heel and the mount pad toward the supporting surface of the support structure. 930 |
|---|

*FIG. 8*

ANCHORING BRACKET

BACKGROUND

1. Field

Although not so limited in its utility or scope, embodiments of the present invention are particularly well suited for cooperation with a machine tool foot for retaining the machine tool in place on the floor of a workshop or processing facility, for example. A typical embodiment is more generally adapted for anchoring a mount including a force-distributing pad and a stud to a supporting surface.

2. Brief Description of an Illustrative Environment and Related Art

A machine tool mount (e.g., foot) typically includes a downwardly extending support stud connected to a force-distributing support pad adapted for contacting supportive engagement with a support surface which, in the case of machinery, is typically a floor. The force-distributing pad may include one or more fastener-receiving apertures (e.g., anchor bolt holes) to facilitate the securing of the machine tool from which it depends to the floor of a shop or processing facility, for example. As illustrated in FIG. 1A, a typical installation of a machine tool involves the preliminary positioning of the mounts of the machine tool, which is often massive and cumbersome, in the desired locations on the floor to which the machinery is to be secured. Once the machine is preliminarily aligned in the desired location, the floor is marked in locations corresponding to the positions in which the floor is to be bored in order to facilitate the receipt of fasteners through the fastener-receiving apertures in the machine's feet and into bores in the floor.

As shown in FIG. 1B, once the floor has been marked, the machine is moved out of the way to allow a boring tool (e.g., a concrete drill) into the areas to be bored. Boring the floor with the machine tool in place in the desired location is frequently not practicable because the area around each foot of the machine tool is typically obstructed in a way that prevents the perpendicular alignment of a drill and drill bit with the floor for boring in alignment with the fastener-receiving apertures in the feet. The preliminary alignment, and then temporary relocation, of the machine tool required in a typical installation adds to the installation time and presents hazards associated with the movement of heavy machinery. Moreover, multiple lateral moves of the machinery are sometimes necessary as fastener-receiving bores corresponding to each foot are bored into the floor.

Once the fastener-receiving bores have been bored into the support structure, the machine is moved back to the desired position such that fastener-receiving apertures in the mounts are aligned with fastener-receiving bores in the floor, as shown in FIG. 1C. Finally, as shown in FIG. 1D, a fastener (e.g., a threaded fastener such as a screw or bolt) is inserted through each fastener-receiving aperture of a selected set of fastener-receiving apertures in the mounts and into a corresponding fastener-receiving bore in the floor for threadable engagement with an internally threaded fastener below the floor (not shown), for example or, as shown in FIG. 1D, a side defining the fastener-receiving bore.

As illustrated in FIG. 1E, a further difficulty is encounter by those employing present methods of machine tool anchoring when conduits or wiring, for instance, reside below the floor in the areas corresponding to drill hole locations as determined by the apertures in the machine feet. For example, a machine tool often must be secured in a very specific position with very little tolerance for positional deviation. It is not uncommon in processing facilities for pipes or wiring to reside directly below an area of the floor to be bored as shown in FIG 1E. The presence of conduits or wiring below the desired foot location presents a substantial obstacle requiring a cumbersome solution such as conduit re-routing or a customized machine mounting solution, for example.

Accordingly, there exists a need for apparatus and a method that facilitate the positioning of machinery in a desired floor location and the anchoring of the machinery to the floor while obviating the need for temporary removal of the machinery to accommodate floor boring. Moreover, there is a need for apparatus and a method of machine anchoring that alleviates difficulties encountered when conduits or other obstacles reside below bore locations as dictated by the fastener holes in the feet provided with a machine.

SUMMARY

Various embodiments of an anchoring bracket are adapted for anchoring a mount including a force-distributing pad and a stud to a support surface such as a floor, wall, ceiling, roof, post or beam, for example. For illustrative purposes, one or more embodiments is shown and described in association with a mount in the form of a foot for supporting a unit of machinery. However, it is to be understood that the machinery environment is discussed only for illustrative purposes and that embodiments of the invention are applicable to a broader set of applications. A typical extant foot for supporting a unit of machinery includes a stud member depending downwardly along a vertical axis from a frame member such as a machine tool table leg, for example. Depending from a lower end of the stud member is a weight-distributing pad typically having a floor-engaging lower surface larger in area than the cross-sectional area of the stud member as viewed into a plane perpendicular to a vertical axis.

A supplemental anchoring bracket, when cooperatively used with a mount including a support stud depending from a force-distributing pad, facilitates the selective application of an anchoring force to the force-distributing pad toward a support surface from a location laterally displaced from the stud and to the exterior of the pad perimeter.

In various embodiments, an anchoring bracket is adapted for applying an anchoring force to a mount including a support stud extending along a stud axis and depending from a force-distributing pad. The force-distributing pad includes a first side with a contact surface defined by a perimeter and adapted for supporting engagement with a support surface. A second side of the mount pad, opposite the first side, includes an anchoring-force bearing surface.

The anchoring bracket includes an elongated shank having first and seconds ends and an anchoring-force application region located between the first and second ends. A first shank portion is situated at least one of (a) at the first end of the shank and (b) between the first end and the anchoring-force application region of the shank. The first shank portion includes an anchoring-force-exerting surface adapted for positioning within the interior of the pad perimeter for selective force-exerting engagement with the anchoring-force bearing surface of the mount pad. A heel depends from a second shank portion more distant from the first end of the shank than the anchoring-force application region. The heel is adapted for selective force-exerting engagement with the support surface in a location exterior to the pad perimeter so that, when (i) the shank is oriented such that the force-exerting surface of the first shank portion is positioned for force-exerting engagement with the anchoring-force bearing surface of the mount pad and the heel is positioned for force-exerting engagement with the support surface outside the perimeter of the contact surface of the mount pad and (ii) an anchoring force directed toward the support surface is applied to the anchoring-force application region of the shank, the anchoring force is distributed to the heel and the first shank portion thereby urging the heel and the pad of the mount toward the supporting surface.

In various embodiments, an anchoring force is applied to the anchoring-force application region by the threadable application of tension to an elongated fastener such as a bolt or screw, for instance, in order to urge the shank toward the support surface. Various versions implementing an elongated fastener under tension include a fastener-receiving aperture in the anchoring-force application region for accommodating the extension of the elongated fastener between the anchoring-force application region and the support structure. Alternative fastener-implementing embodiments are depicted in various drawings and discussed in the detailed description. Moreover, methods of applying an anchoring force to a mount using a single-shank anchoring bracket are described in the detailed description and illustrated in drawings.

In various alternative embodiments adapted for applying an anchoring force to a mount of the general type previously described, an anchoring bracket has a base region including an anchoring-force-exerting surface adapted for selective force-exerting engagement with the anchoring-force bearing surface of the force-distributing pad of the mount. Extending laterally outward (e.g., generally along the support surface when the bracket is oriented for use) from the base are at least two elongated shanks. Each shank has a base end and a distal end opposite the base end and each shank of a selected set of shanks has an anchoring-force application region located between its base and distal ends. Depending from a distal shank portion more distant from the base region than the anchoring-force application region, in various versions, is a heel. Each heel is adapted for selective force-exerting engagement with the support surface in a location exterior to the pad perimeter of the mount such that, when (i) the anchoring-force exerting surface of the base region is positioned for force-exerting engagement with the anchoring-force bearing surface of the mount pad, and (ii) with respect to each shank of a selected set of shanks positioned such that the heel depending from that shank is positioned for force-exerting engagement with the support surface in a location exterior to the pad perimeter of the mount, an anchoring force directed toward the support surface is applied to the anchoring-force application region of that shank, the anchoring force is distributed to the heel of that shank and the base region thereby urging the heel and the force-distributing pad of the mount toward the support surface.

Similarly to single-shank versions, in a typical case, an anchoring-force application region to which an anchoring force is to be applied is positioned such that at least a portion of the anchoring-force application region is outside the perimeter of the mount pad. Moreover, the anchoring force applied to each shank in a multi-shank version will typically involve the application of tension along the axis of an elongated fastener. As is the case with single-shank versions, illustrative multi-shank versions, and methods of applying an anchoring force to a mount using a multi-shank anchoring bracket, are discussed in the detailed description and illustrated in drawings.

Although an anchoring force is typically applied by the threadable application of tension to an elongated fastener, it is to be understood that alternative apparatus and methods of applying an anchoring force are within the scope and contemplation of the invention. For instance, even where a fastener is used, that fastener need not necessarily be threaded. Illustrative, non-limiting examples of non-threaded fasteners to which tension, or compression where indicated by the circumstances, may be applied to maintain an anchoring force are a rivet, a pin, a press-stud, a buckle, a cable, a hook, one or more links of chain, a clip and a length of strap. Additional examples of fasteners including at least one threaded rod are a turnbuckle, the use of which may also be indicated by the circumstances and a U-bolt. As is generally known, turnbuckles exist in alternative forms including one or more closed "eyes" or open hooks.

BRIEF DESCRIPTION OF THE DRAWINGS

FIGS. 1A through 1E depict steps associated with a current method of anchoring a mount having a force-distributing pad and a support stud to a support surface and are discussed in the background section of the specification;

FIG. 4 is an illustrative method of applying an anchoring force to a mount using an anchoring bracket;

FIG. 6 depicts an illustrative method of applying an anchoring force to a mount using an anchoring bracket including a fixedly-depending elongated fastener;

FIG. 8 illustrates a method of applying an anchoring force to a mount using a multi-shank anchoring bracket.

DETAILED DESCRIPTION

The following description of various embodiments of a supplemental anchoring bracket is illustrative in nature and is therefore not intended to limit the scope of the invention or its application of uses.

Figure 2A:
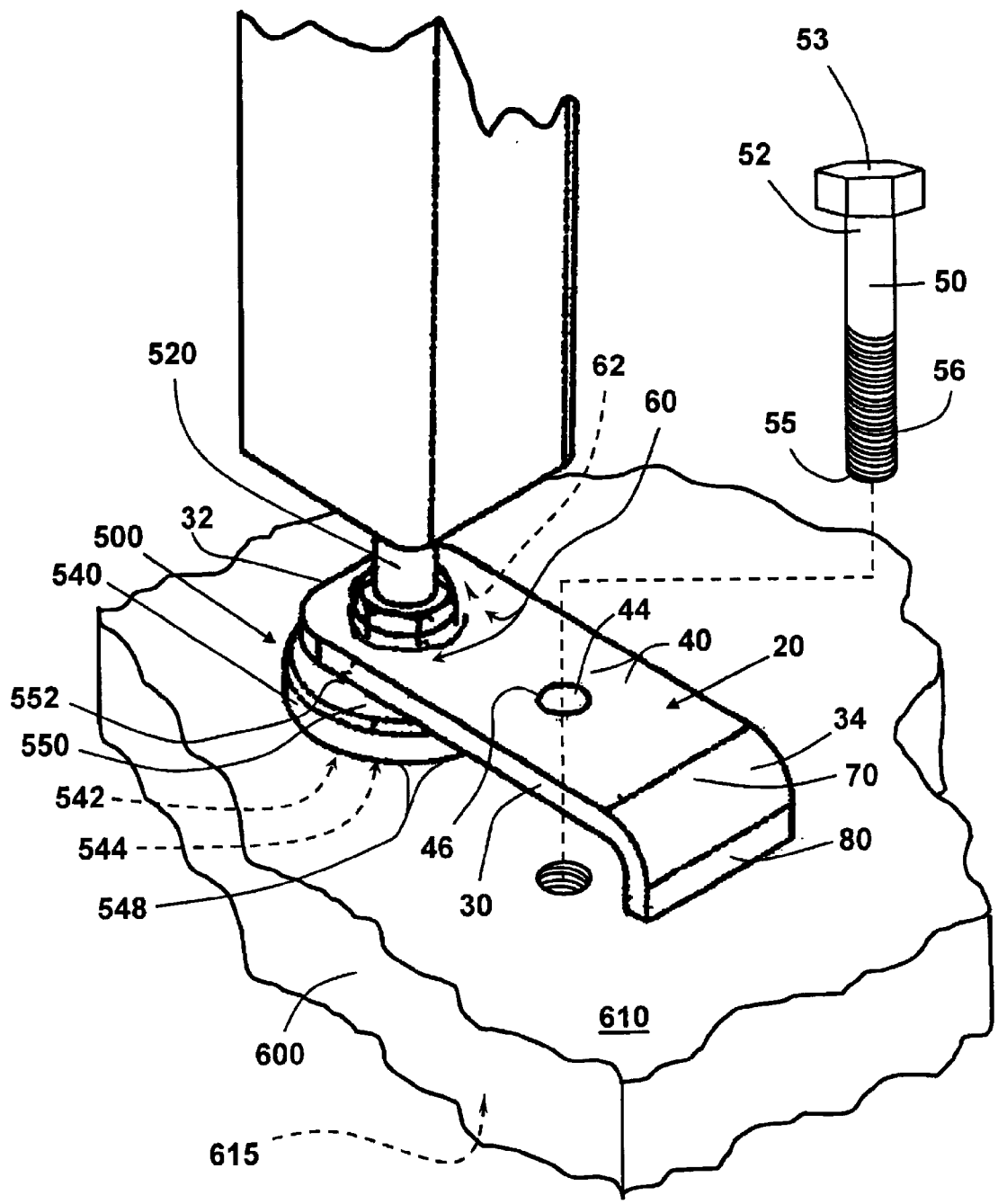
FIG. 2A is a perspective view of an illustrative single-shank anchoring bracket in cooperative engagement with a mount.
Figure 2B:
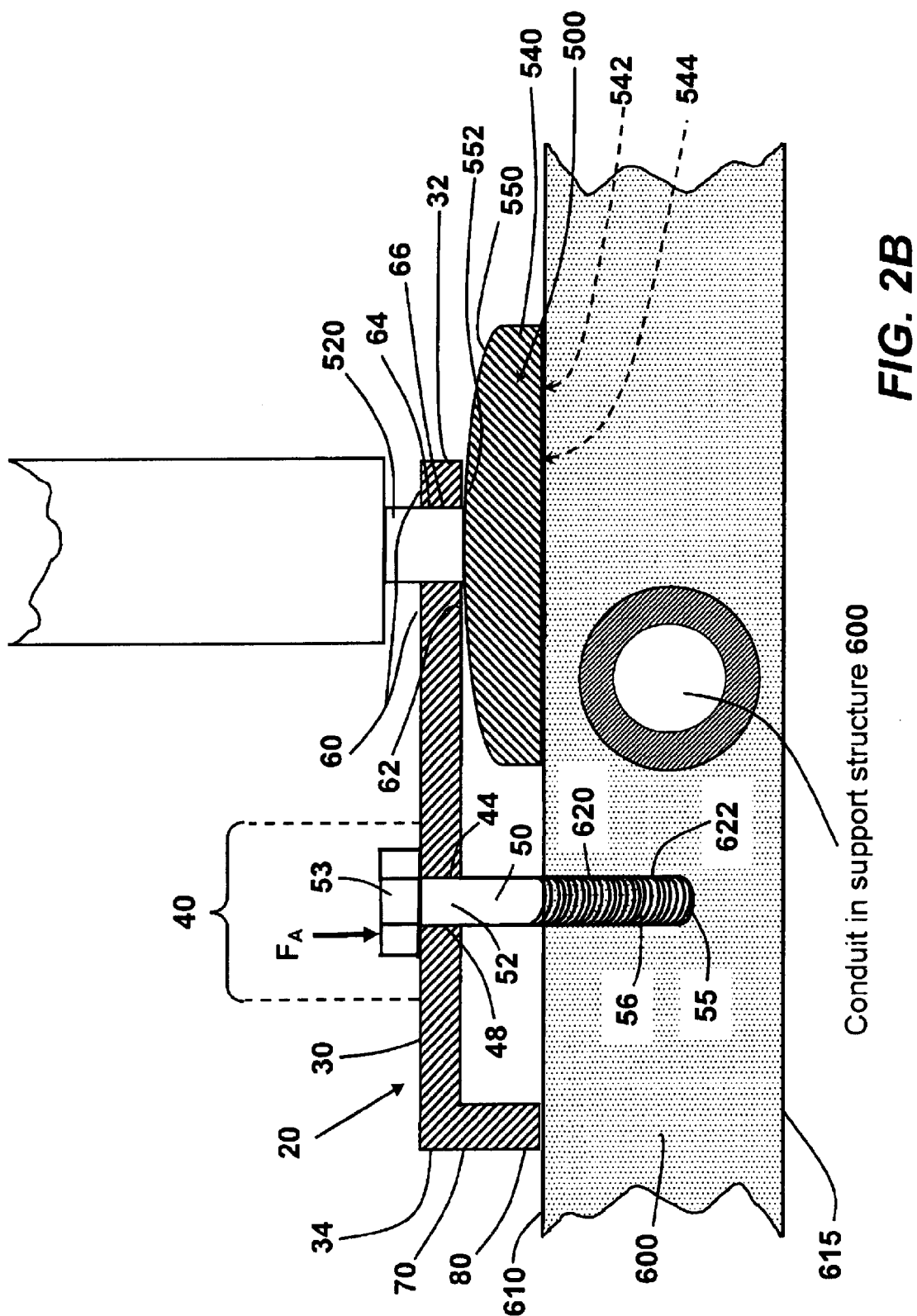
FIG. 2B is a side view of an illustrative single-shank anchoring bracket in cooperative engagement with a mount.

FIGS. 2A and 2B illustrate in a perspective and a partial cross-sectional side view, respectively, embodiments of an anchoring bracket 20 adapted for use in combination with a mount 500 including a support stud 520 depending from a force-distributing pad 540. The force-distributing pad 540 has a first side 542 including a contact surface 544 defined by a perimeter 548 and adapted for supporting engagement with a support surface 610 of a support structure 600. A second side 550 opposite the first side 542 includes an anchoring-force bearing surface 552, the purpose of which will be explained further in this description.

Referring to the illustrative embodiments of FIGS. 2A and 2B, an anchoring bracket includes an elongated shank 30 having first and second ends 32 and 34. Located between the first and second ends 32 and 34 is an anchoring-force application region 40 to which an anchoring force directed toward the support surface 610 may be selectively applied. In a typical version, including those of FIGS. 2A and 2B, the anchoring-force application region 40 includes a fastener-receiving aperture 44 adapted to receive an elongated threaded-rod fastener 50 such as a bolt or screw, for example. As will be appreciated further in this description, an anchoring force is typically applied to the anchoring-force application region 40 by threadably applying tension to a threaded rod fastener 50 that extends between the support structure 600 and the anchoring-force application region 40 of the shank 30, thereby urging the shank 30 in the direction of the support surface 610.

Located between the first end 32 and the fastener-receiving aperture 44 in the embodiments of FIGS. 2A and 2B, and more generally between the first end 32 and the anchoring-force application region 40, is a first shank portion 60 including an anchoring-force-exerting surface 62 adapted for selective exertion of an anchoring force $F_A$ against the anchoring-force bearing surface 552 of the force-distributing pad 540 of a mount is 500. Moreover, in the versions of FIGS. 2A and 2B, the first shank portion 60 includes a stud-receiving aperture 64 (not shown in FIG. 2A) adapted for receiving the support stud 520 of the mount 500. In these illustrative versions, the stud-receiving apertures 64 are defined by a laterally closed boundary 66 such that a support stud 520 cannot be laterally introduced into the aperture 64, but must instead be passed through the aperture 64 generally along an axis (not shown) extending through the aperture 64. Alternative versions, examples of which are discussed further in this description, and illustrated in the drawings, include stud apertures 64 defined by laterally open boundaries 68 such that the support stud 520 of a mount 500 can be positioned within the aperture 64 through lateral movement of the shank 30 with respect to the support stud 520. Versions of the latter type facilitate installation of the shank 30 about a support stud 520 without the need for insertion of the support stud 520 through the aperture 64. Analogously, alternative versions of anchoring brackets 20 include fastener-receiving apertures 44 defined by laterally open and closed boundaries 46 and 48, the former facilitating lateral introduction of a fastener 50 into the aperture 44.

Referring still to FIGS. 2A and 2B, a typical version further includes a second shank portion 70 more distant from the first end 32 of the shank 30 than the anchoring-force application region 40 and, where applicable, the fastener-receiving aperture 44 thereof. Depending from the second shank portion 70 is a heel 80. When the anchoring bracket 20 is oriented for use, the heel 80 extends toward the support structure 600 and is adapted for force-exerting engagement with the support surface 610 in a location exterior to the perimeter 548 of the force-distributing pad's contact surface 544.

Alternative illustrative versions within the scope and contemplation of the invention include an anchoring bracket 20 (i) lacking a stud-receiving aperture 64 while including a fastener-receiving aperture 44; (ii) including a stud-receiving aperture 64 and lacking a fastener-receiving aperture 44; and (iii) lacking a stud-receiving aperture 64 and a fastener-receiving aperture 44, by way of non-limiting example. An illustrative depiction of each of alternative versions i, ii and iii is illustrated in FIGS. 3A, 3B and 3C and D, respectively, and briefly described below.

Figure 3A:
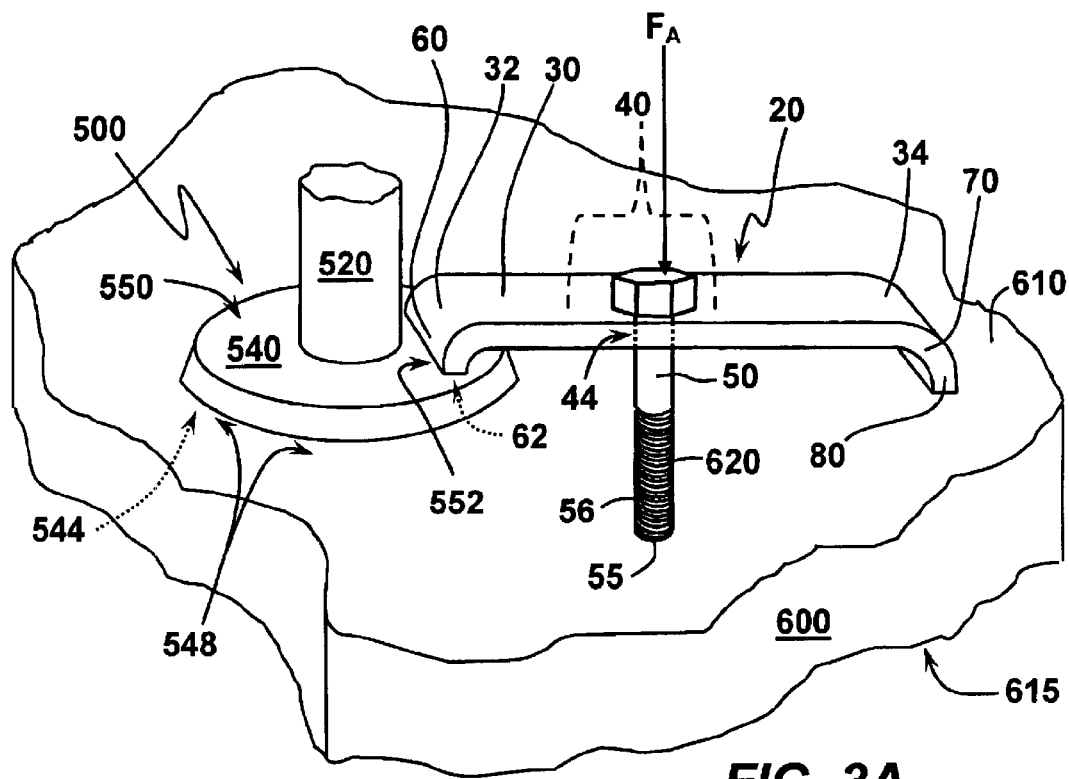
FIGS. 3A through 3D depict illustrative alternative versions of single-shank anchoring brackets.

Referring to the version of FIG. 3A, the first shank portion 60, and an anchoring-force-exerting surface 62 thereof, coincide with the first end 32 of the shank 30. In this particular version, the anchoring-force-exerting surface 62 is still situated for force-exerting engagement with the anchoring-force bearing surface 552 within the perimeter 548 of the force-distributing pad's contact surface 544, but the first shank portion 60 lacks a stud-receiving aperture 64 defined by a closed 66 boundary or an open boundary 68 that at least partially circumscribes the support stud 520.

Figure 3B:
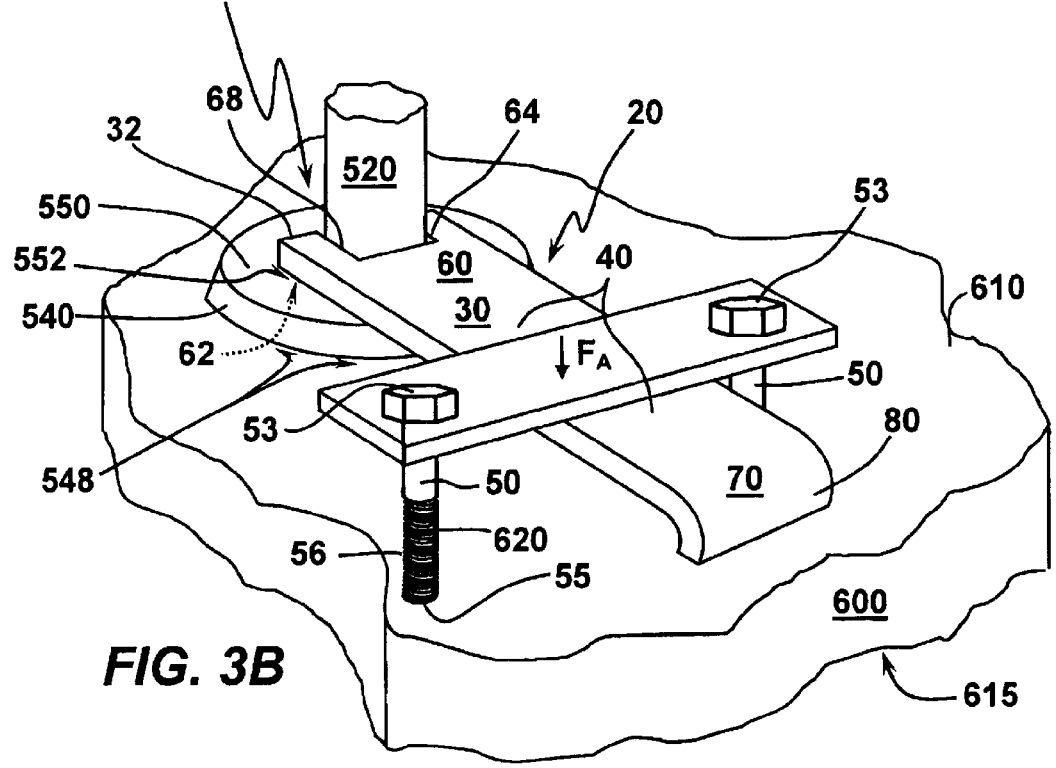

In the illustrative version of FIG. 3B, the first shank portion 60 includes a laterally open stud-receiving aperture 64 adapted for partial circumscription of the support stud 520, but lacks a fastener-receiving aperture 44. In this particular instance, two elongated fasteners 50 are placed under tension to apply an anchoring force $F_A$ to an intermediate element (e.g., a metal plate or bar) which in turn transfers the anchoring force $F_A$ to the anchoring-force application region 40 of the shank 30.

Figure 3C:
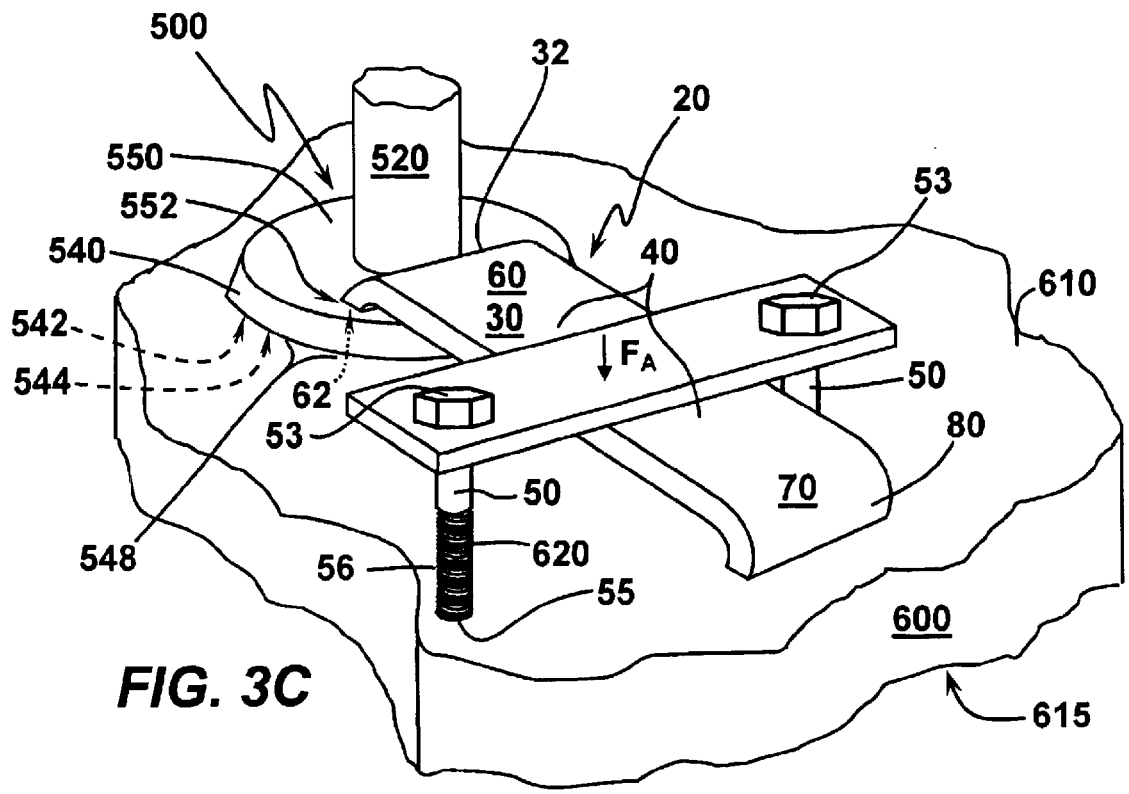

In the illustrative version of FIG. 3C, the shank 30 lacks both a stud-receiving aperture 64 and a fastener-receiving aperture 44. Similar to the shank 30 of FIG. 3A, the first end 32 of the shank 30 is adapted for force-exerting engagement with the anchoring-force bearing surface 552 within the perimeter 548 of the force-distributing pad's contact surface 544. Additionally, an anchoring force $F_A$ is applied to the anchoring-force application region 40 in a fashion similar to the case shown in FIG. 3B.

Figure 3D:
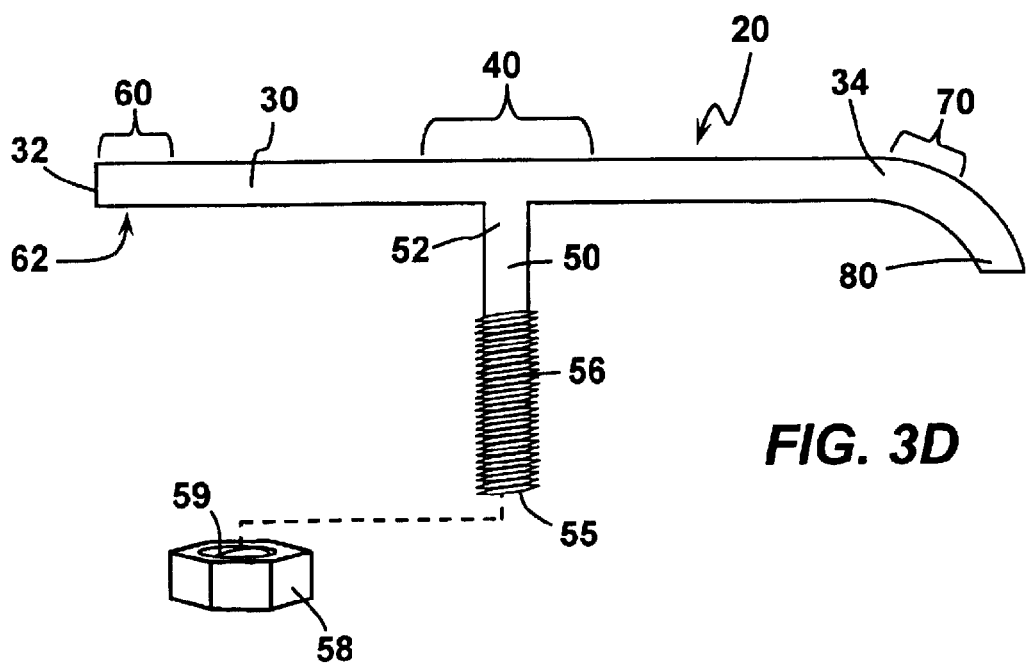

In yet another illustrative version, shown in FIG. 3D, an anchoring bracket 20 lacking a fastener-receiving aperture 44 includes a threaded rod fastener 50 fixedly depending from the anchoring-force application region 40 of the shank 30. A version of this type would be employed in accordance, for instance, with the illustrative method 800 shown in FIG. 6 and discussed later in this description.

In conjunction with FIGS. 2A, 2B and 4, an illustrative method of applying an anchoring force $F_A$ to a mount 500 including a support stud 520 extending along a stud axis and depending from a force-distributing pad 540 including opposed contact and anchoring-force bearing surfaces 544 and 552 is now described. Referring to FIG. 4, a sequence of method steps illustrates a method of applying an anchoring force $F_A$ to a mount 500. It should be noted that the sequence of steps presented in the drawing and the text to follow is illustrative only and not necessarily indicative of the order in which the steps must be performed. Accordingly, nothing in the drawings, this description or the corresponding claims should be construed so as to limit the scope of the invention to a particular sequence of steps in the absence of explicit statements to the contrary or unless a particular order is inextricably dictated by context (e.g., an instance in which it is impossible to perform a particular step prior to the performance of another step.).

The illustrative method 700 illustrated in FIG. 4 includes a step 710 of providing an elongated, rigid shank 30 having (i) first and second ends 32 and 34, (ii) an anchoring-force application region 40 located between the first and second ends 32 and 34, (iii) a first shank portion 60 situated at least one of (a) at the first end 32 of the shank 30 and (b) between the first end 32 and the anchoring-force application region 40 and (iv) a heel 80 depending from a second shank portion 70 more distant from the first end 32 than the anchoring-force application region 40.

At 715, the contact surface 544 of the mount 500, which is defined by a perimeter 548, is positioned in a desired position along the support surface 610.

At 720, the shank 30 is oriented such that the first shank portion 60 is positioned for force-exerting engagement with the anchoring-force bearing surface 552 of the mount pad 540 and such that the heel 80 is outside the perimeter 548 of the contact surface 544 of the mount pad 540 and the anchoring-force application region 40 is at least partially outside the perimeter 548 of the contact surface 544.

At step 725, the heel 80 is positioned in a desired position along the support surface 610 for force-exerting engagement therewith. It is to be understood, as with other instances in which one object is described as being in "force-exerting engagement" with another object, that "force-exerting engagement" does not necessary require direct physical contact. For instance, an intervening spacer may be located between two objects that are in force-exerting engagement with one another. For example, a bolt head may be caused to exert a force on a plate of metal, with the force being transferred through one or more washers. Although, in such an instance, the bolt head is not in direct physical contact with the metal plate, it is in force-exerting engagement with the metal plate. Similarly, other objects (e.g., washers, spacer plates, etc.) may intervene between, for example, the heel 80 and the support surface 610 or the first shank portion 60 and the anchoring-force bearing surface 552 of the mount pad 540.

At step 730, a support-surface-directed force is applied the anchoring-force application region 40 of the shank 30. This anchoring force is distributed through the shank 30 to the first shank portion 60 and the heel 80 thereby urging the mount pad 540 and the heel 80 in the direction of the support surface 610. As indicated previously in this description, and throughout the remainder of this description and the drawings, the anchoring force $F_A$ is typically applied to the anchoring-force application region 40 by placing a fastener (e.g., a bolt or screw) under tension along the axis of the fastener. It will be appreciated that the anchoring force $F_A$ applied to the anchoring-force application region 40 is proportional, but not necessarily equal, to the tension in an applied fastener. The ratio of the magnitude of the tension in an applied fastener to the total magnitude of the anchoring force $F_A$ applied to the anchoring force application region 40 depends on such factors as the total number of fasteners used and the cosine of the angle between a fastener axis and an axis parallel to a vector representative of the total anchoring force applied to the anchoring-force application region 40. Accordingly, only under a particular set of conditions will the magnitude of the tension in a fastener equal the magnitude of the total anchoring force. Moreover, as previously stated in the summary, the anchoring force may be applied by applying tension to a variety of alternative fasteners and the illustrations and text demonstrating the application of an anchoring force using an elongated threaded fastener 50 are regarded as illustrative and non-limiting. The proper use of any of the alternative fasteners previously listed will readily occur to an individual of ordinary skill in the art, particularly such an individual provided with the benefit of this disclosure and the suggested uses of an elongated threaded fastener 50 included herein.

FIGS. 2B and 5A through 5C depict various illustrative arrangements in which an anchoring force $F_A$ is applied to the anchoring-force application region 40 through the application of tension to an elongated fastener 50. Depicted subsequent to step 730 in FIG. 4 are alternative sets of steps coinciding with FIGS. 2B and 5A through 5C for the implementation of an elongated fastener 50 in applying an anchoring force $F_A$ to the shank 30. In each of the illustrative instances depicted in FIGS. 2B and 5A through 5C, the anchoring-force application region 40 includes a fastener-receiving aperture 44. Furthermore, in each of the instances depicted in FIGS. 2B, 5A and 5B, an elongated fastener 50 having a head end 52, a second end 55 opposite the head end 52 and a set of external threads 56 extending from the second end 52 toward the head end 52 is implemented. Moreover, although some of the method steps in the illustrative method of FIG. 4 apparently imply a fastener-receiving aperture 44 defined by a closed boundary 48 by the use of such language as "passing the second end of the elongated fastener through the fastener-receiving aperture in the shank and into the fastener-receiving bore in the support structure" at step 750, for instance, it is to be understand that lateral introduction of a fastener 50 into a fastener-receiving aperture 44 defined by an open boundary 46 is covered by an alternative process step not specifically depicted in the illustrative process(es) of FIG. 4. That is, "passing the second end of the elongated fastener through the fastener-receiving aperture in the shank and into the fastener-receiving bore in the support structure" is merely one relatively specific instance of the more general act of introducing a fastener into a fastener-receiving aperture and language such as "introducing an elongated fastener 50 into the fastener-receiving aperture 44" would include the acts of both lateral introduction into a fastener-receiving aperture 44 defined by an open boundary 46 and axial introduction through a fastener-receiving aperture 44 defined by a closed boundary 48.

Figure 5A:
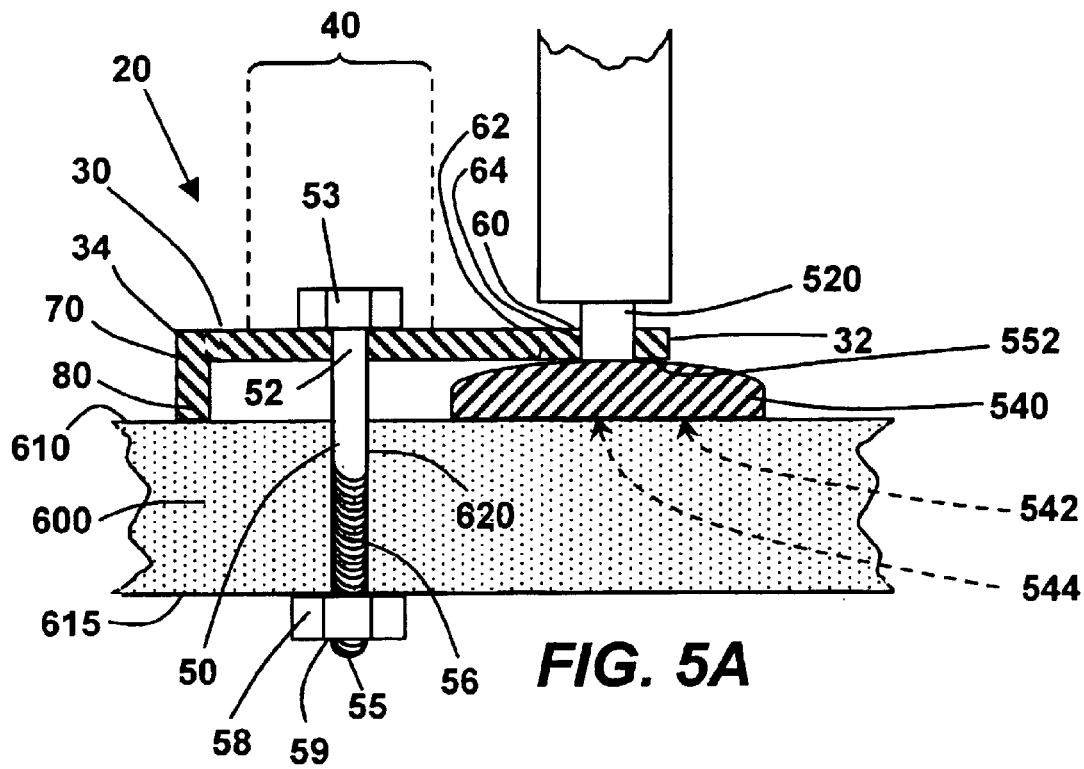
FIGS. 5A through 5C represent alternative implementations in which an anchoring force is applied to a mount and anchoring bracket by placing an elongated threaded fastener under tension.
Figure 5B:
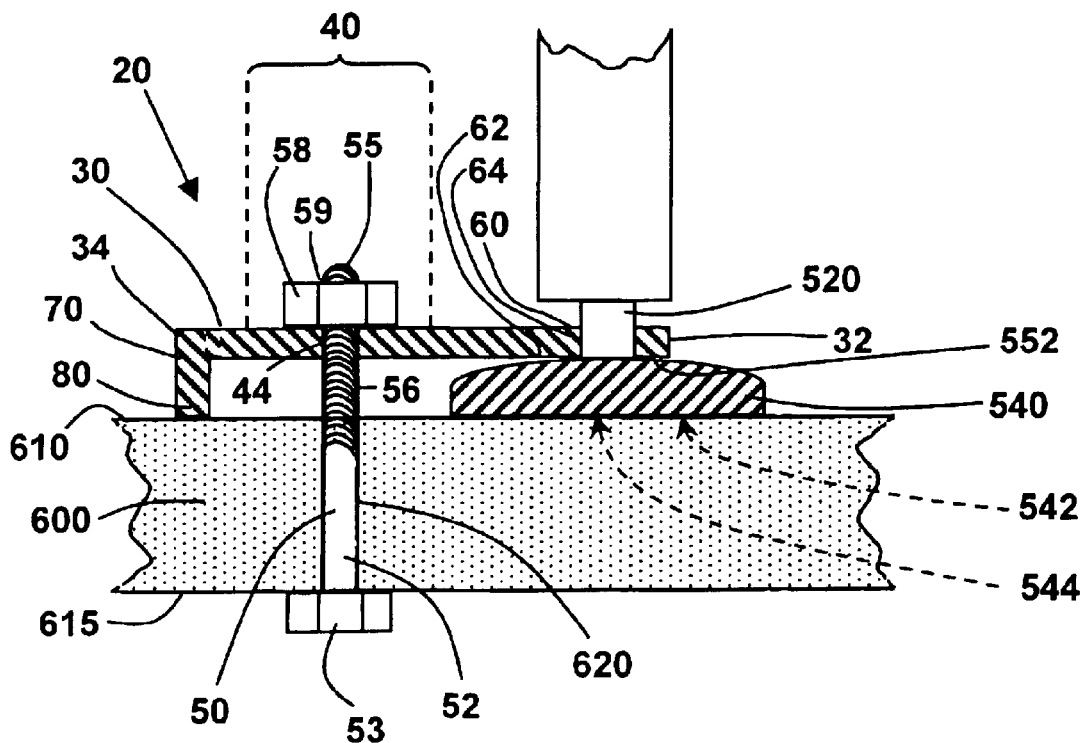

Referring to FIGS. 2B, 5A, 5B and 4, at step 740, a fastener-receiving bore 620 is formed (e.g., bored) in the support structure 600 through the support surface 610. As shown in FIGS. 2B, 5A and 5B, the fastener-receiving bore 620 may extend only partially into the support structure 600, as shown in FIG. 2B, or, as shown in FIGS. 5A and 5B, through a second surface 615 of the support structure 600 opposite the support surface 610.

At step 745, the fastener-receiving aperture 44 in the shank 30 is aligned with the fastener-receiving bore 620 in the support structure 600.

At step 750, the second end 55 of the fastener 50 is passed through the fastener-receiving aperture 44 in the shank 30 and into the fastener-receiving bore 620 in the support structure 600. At step 755, the external threads 56 of the fastener 50 are threaded into a set of internal threads 622 inside the fastener-receiving bore 620 and the fastener head 53 is threadably advanced toward the support surface 610 until the head 53 is brought into force-exerting engagement with the anchoring-force application region 40 and an anchoring force $F_A$ of desired magnitude is applied to the anchoring force application region 40 as shown in FIG. 2B. The internal threads 622 may be provided in a number of alternative ways each of which may depend at least in part on the material from which the support structure 600 is formed. For instance, where the support structure 600 is wood, the threads 622 may be formed by the threading of the fastener 50 into the fastener-receiving bore 620. If, for example, the support structure 600 is metal or concrete, threads 622 may be molded therein at the time of fabrication of the support structure 600 or tapped subsequent to fabrication of the support structure 600. In still another instance, an internally threaded sleeve anchor (not shown) may be set (e.g., impacted) into the support structure 600.

In an alternative method beginning at step 760, and shown in a completed state in FIG. 5A, the second end 55 of the fastener 50 is passed through the fastener-receiving aperture 44 in the shank 30 and through the fastener-receiving bore 620 in the support structure 600 until the second end 55 emerges through the second surface 615 and at least a portion of the set of threads 56 protrudes with respect the second surface 615. At step 765, the external threads 56 of the fastener 50 are threaded into a set of internal threads 59 in an internally threaded fastener 58 and the fastener head 53 is threadably advanced toward the support surface 610 until the head 53 is brought into force-exerting engagement with the anchoring-force application region 40 and an anchoring force $F_A$ of desired magnitude is applied to the anchoring force application region 40.

FIG. 5B represents a fastener arrangement that may be achieved by the performance of steps 770 and 775 in FIG. 4. In accordance with steps 740 and 745, a fastener-receiving bore 620 is formed in the support structure 600 such that it passes through both the support surface 610 and the second surface 615 opposite the support surface 610 and the fastener-receiving aperture 44 in the shank 30 is aligned with the fastener-receiving bore 620. At step 770, the second end 55 of the fastener 50 is passed through the fastener-receiving bore 620 in the support structure 600 and through the fastener-receiving aperture 44 in the shank 30 and until the second end 55 emerges through the anchoring-force application region 40 and at least a portion of the set of threads 56 protrudes with respect to the outwardly-facing surface of the anchoring-force application region 40. At step 775, the external threads 56 of the fastener 50 are threaded into a set of internal threads 59 in an internally threaded fastener 58 and the internally threaded fastener 58 is threadably advanced toward the support surface 610 until the internally threaded fastener 58 is brought into force-exerting engagement with the anchoring-force application region 40 and a support-structure-directed anchoring force $F_A$ of desired magnitude is applied to the anchoring force application region 40 with the application of tension to the elongated fastener 50.

Figure 5C:
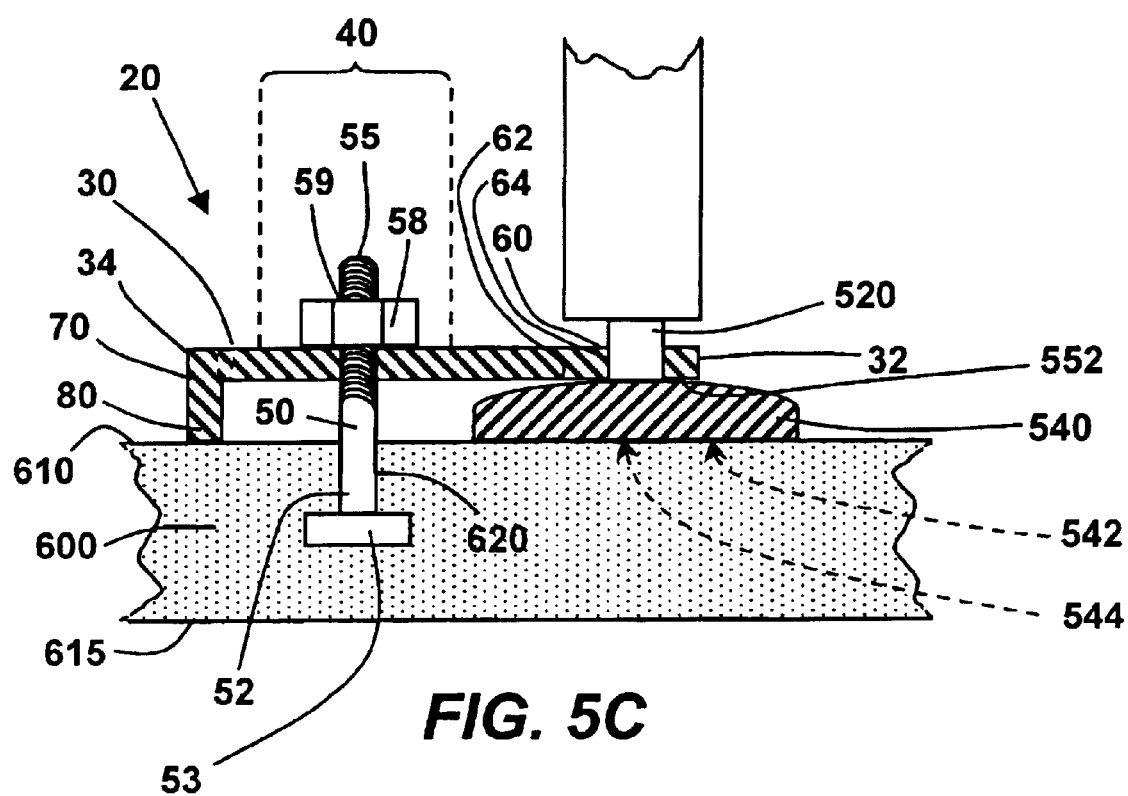

FIG. 5C and steps 780 and 785 represent a fastener arrangement and anchoring method in which, according to step 780, an elongated threaded fastener having a head end 52 (which may or may not include an enlarged head 53), a second end 55 opposite the head end 52 and a set of external threads 56 extending from the second end 55 toward the head end 52 has its head end 52 retainably embedded in the support structure 600 such that a least a portion of the set of threads 56 protrudes with respect to the support surface 610. The head end 52 may be embedded, for example, by setting the fastener 50 in a concrete support structure 600 before the concrete sets up. Alternatively, the fastener 50 can be set for frictional retention by impact; retained in a bore 620 by an adhesive such as epoxy; placed in a bore 620 and retained by a bead of weld or adapted for threading into a bore 620, by way of non-limiting example.

Referring to FIGS. 3D and 6, another alternative method of applying an anchoring force $F_A$ to a mount 500 is now described.

The illustrative method 800 depicted in FIG. 6 includes a step 810 of providing an elongated, rigid shank 30 having (i) first and second ends 32 and 34, (ii) an anchoring-force application region 40 located between the first and second ends 32 and 34, (iii) an elongated threaded rod fastener 50 having a head end 52 fixedly depending from the anchoring-force application region 40, a second end 55 opposite the head end 52, and a set of external threads 56 extending from the second end 55 toward the head end 52; (iv) a first shank portion 60 situated at least one of (a) at the first end 32 of the shank 30 and (b) between the first end 32 and the anchoring-force application region 40 and (v) a heel 80 depending from a second shank portion 70 more distant from the first end 32 than the anchoring-force application region 40.

At 815, the contact surface 544 of the mount 500, which is defined by a perimeter 548, is positioned in a desired position along the support surface 610.

At 820, the shank 30 is oriented such that the first shank portion 60 is positioned for force-exerting engagement with the anchoring-force bearing surface 552 of the mount pad 540 and such that the heel 80 is outside the perimeter 548 of the contact surface 544 of the mount pad 540 and the anchoring-force application region 40 is at least partially outside the perimeter 548 of the contact surface 544.

At step 825, the heel 80 is positioned in a desired position along the support surface 610 for force-exerting engagement therewith.

At step 830, a fastener-receiving bore 620 is formed (e.g., bored) in the support structure 600 through the support surface 610 and through a second surface 615 of the support structure 600 opposite the support surface 610. The bore 620 is adapted to receive the threaded fastener 50 such that the second end 55 of the fastener 50 protrudes beyond the second surface 615 of the support structure 615.

In accordance with step 835, the second end 55 of the fastener 50 fixedly depending from the anchoring-force application region 40 is passed through the fastener-receiving bore 620 in the support structure 600 until the second end 55 emerges through the second surface 615 and at least a portion of the set of threads 56 protrudes with respect the second surface 615. At step 840, the external threads 56 of the fastener 50 are threaded into a set of internal threads 59 in an internally threaded fastener 58 (e.g., a nut) and the fastener head 53 is threadably advanced toward the support surface 610 until an anchoring force $F_A$ of desired magnitude is applied to the anchoring force application region 40. In this case, the threadable advancement of the fastener head 53 toward the surface 610 is achieved by the threading of the internally threaded fastener 58 onto the threads 56 and toward to second surface 615 of the support structure 600, thereby placing the fastener 50 under tension.

Referring to FIGS. 7A thru 7D, representative alternative versions of an anchoring bracket 120 adapted for use in combination with a mount 500 of the general type previously described are illustrated, each of which brackets 120 includes a base region 122 from which multiple (i.e., a plurality of two or more) elongated shanks 130 extend. Each shank 130 includes a base end 132 and a distal end 134 opposite the base end 132. Situated between the base and distal ends 132 and 134 of each shank 130 of a selected set of shanks 130 is an anchoring-force application region 140 and, typically, a fastener-receiving aperture 144 adapted to receive an elongated threaded-rod fastener 50 of a general type previously described. As with illustrative versions previously described in connection with single-shank brackets 20, alternative versions of a multi-shank bracket 120 include one or more fasteners 50 fixedly depending from the anchoring-force application region 140 of a shank 130.

Figure 7A:
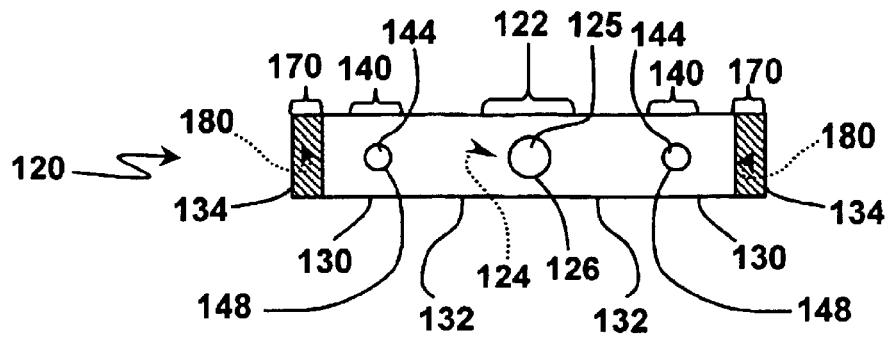
FIGS. 7A through 7D depict illustrative alternative versions of anchoring brackets including a base region and at least two shanks outwardly depending from the base region.
Figure 7B:
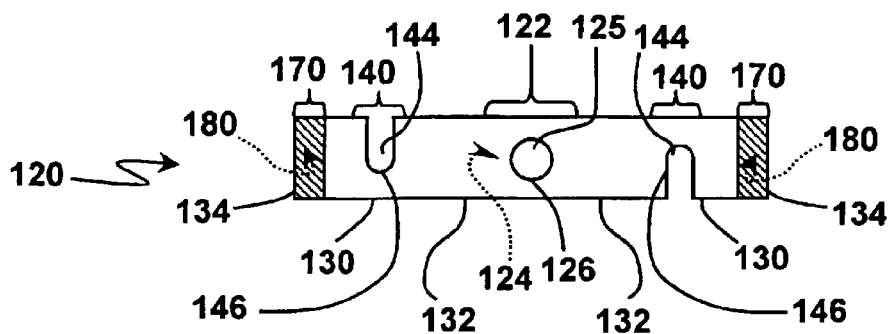
Figure 7C:
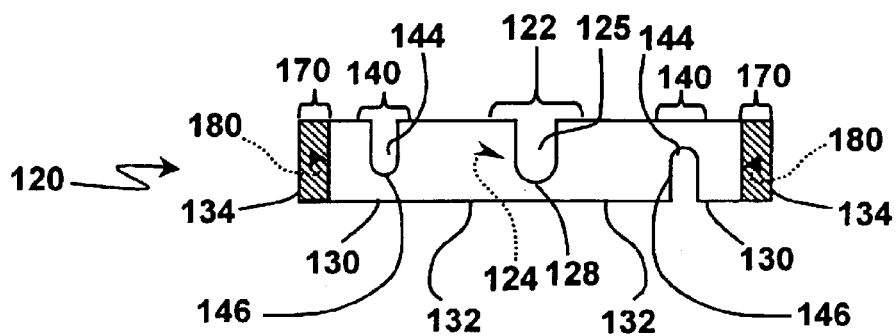
Figure 7D:
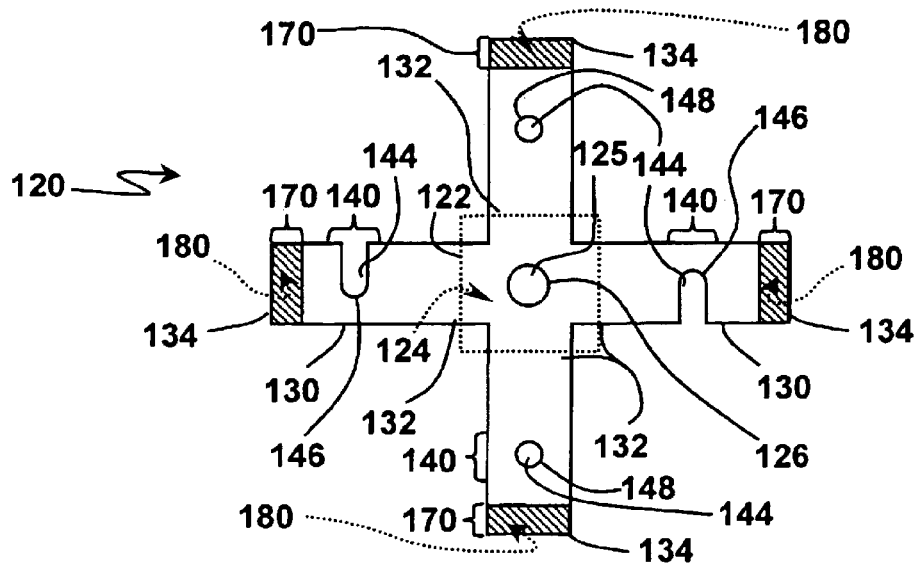

The base region 122 of each of the alternative versions of multi-shank brackets 120 illustrated in FIGS. 7A thru 7D is analogous to the first shank portion 60 of the embodiments of single-shank brackets 20 previously described and illustrated at least insomuch as the base region 122 includes an anchoring-force-exerting surface 124 adapted for selective exertion of an anchoring force $F_A$ against the anchoring-force bearing surface 552 of the force-distributing pad 540 of a mount 500. The base region 122 furthermore typically includes a stud-receiving aperture 125 adapted for receiving the support stud 520 of the mount 500. Based on the previous description in connection with alternative single-shank versions, it will be readily appreciated that a stud-receiving aperture 125 can be defined by a laterally closed boundary 126 as shown, for example, in FIGS. 7A, 7B and 7D, or a laterally open boundary 128 as shown, for instance, in FIG. 7C. Similarly, alternative versions of a multi-shank anchoring bracket 120 include a fastener-receiving aperture 144 defined by a laterally open boundary 146 such as those depicted, for example, in FIGS. 7B thru 7D or a laterally closed boundary 148 as shown in FIGS. 7A and 7D. Still other versions of a multi-shank bracket 120 not shown in the drawings lack a stud-receiving aperture 125.

Each shank 130 of a multi-shank anchoring bracket 120 includes a distal shank portion 170 more distant from the base region 122 of the anchoring bracket 120 than the anchoring-force application region 140 of that shank 130. Depending from the distal shank portion 170 is a heel 180. When a multi-shank anchoring bracket 120 is oriented for use, each heel 180 of a selected set of heels 180 extends toward the support structure 600 and is adapted for force-exerting engagement with a support surface 610 thereof in a location exterior to the perimeter 548 of the force-distributing pad's contact surface 544.

In alternative versions of multi-shank anchoring brackets 120, the shanks 130 of the bracket 120 extend generally along a single plane and are angularly equi-spaced. For instance, the anchoring brackets 120 of FIGS. 7A through 7C each have two opposed shanks 130 separated by angles of 180°, while the anchoring bracket 120 of FIG. 7D includes four angularly equi-spaced shanks 130 separated by angles of 90°. It will be readily appreciated that alternative configurations within the scope and contemplation of the invention and including angularly equi-spaced shanks 130 are possible. For instance, an anchoring bracket 120 including three angularly equi-spaced shanks 130 defining angles of 120° and an anchoring bracket 120 including a quintet of angularly equi-spaced shanks 130 separated by angles of 72° are additional, but non-limiting, examples of alternative versions. It is also to be understood that the shanks 130 of a multi-shank anchoring bracket 120 need not be angularly equi-spaced or coplanar. In some alternative versions in which some of the shanks 130 include a fastener-receiving aperture 144, fewer than all the shanks 130 include a fastener-receiving aperture 144. Still other versions include at least one each of a fastener-receiving aperture 144 defined by an open boundary 146 and a closed boundary 148 as is the case, for example, of the bracket 120 in FIG. 7D.

Referring to FIG. 8, an illustrative method of applying an anchoring force $F_A$ to a mount 500 of the general type previously described using a multi-shank anchoring bracket 120 includes a set of procedures generally analogous to those previously described in connection with an illustrative method for installing a single-shank anchoring bracket 20. As with the illustrative methods described and illustrated in connection with a single-shank anchoring bracket 20, it is to be understood that the sequence of steps presented in FIG. 8, and the text to follow is illustrative only and not necessarily indicative of the order in which the steps must be performed or of the full scope of any particular step as expressed in the claims. Moreover, for purposes of the illustrative method described below, the various methods of applying an anchoring force $F_A$ by placing a fastener 50 under tension discussed in connection with the methods of FIGS. 4 and 6 are considered equally applicable to the method of FIG. 8 and, therefore, are not reiterated in detail.

Referring to FIG. 8, the illustrative method 900 includes a step 910 of providing an anchoring bracket 120 having (i) a base region 122 including an anchoring-force-exerting surface 124 adapted for selective exertion of an anchoring force $F_A$ against the anchoring-force bearing surface 552 of a mount 500 (ii) at least two elongated shanks 130 extending outwardly from the base region 122, each shank 130 of a selected set of shanks 130 having a base end 132, a distal end 134 opposite the base end 132, an anchoring-force application region 140 situated between the base and distal ends 132 and 134, and a distal shank portion 170 more distant from the base region 122 than the anchoring-force application region 140 of that shank 130; and (iii) a heel 180 depending from the distal shank portion 170 of each shank 130 of a set of shanks 130 selected from among the plurality of shanks 130.

At 915, the contact surface 544 of the mount 500, which is defined by a perimeter 548, is positioned in a desired position along the support surface 610.

At 920, the bracket 120 is oriented such that the anchoring-force-exerting surface 124 of the base region 122 is positioned for force-exerting engagement with the anchoring-force bearing surface 552 of the mount pad 540 and such that at least one heel 180 is outside the perimeter 548 of the contact surface 544 of the mount pad 540 and, with respect to each shank 130 of a selected set of shanks 130 positioned such that the heel 180 depending from that shank 130 is outside the perimeter 548, at least a portion of the corresponding anchoring-force application region 140 of that shank 130 is at least partially outside the perimeter 548 of the contact surface 544.

At step 925, at least one heel 180 of the at least one heels 180 referred to in step 920 is positioned in a desired position along the support surface 610 for force-exerting engagement therewith. It is to be understood that the reference in the current step 925 to at least one heel 180 referred to in step 920 does not imply an order of performance of steps, but is rather purely a reference to structure.

At step 930, a support-surface-directed anchoring force $F_A$ of desired magnitude is applied to the anchoring-force application region 140 of at least one shank 130.

It is to be understood that the anchoring force $F_A$ applied in accordance with method 900 can be applied as previously discussed in connection with methods of applying an anchoring force $F_A$ using a single-shank anchoring bracket 20 including, for example, by any of the various illustrative arrangements in which an anchoring force $F_A$ is applied by placing an elongated fastener under tension.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact construction, implementations and versions shown and described.

What is claimed is:

1. An anchoring bracket for applying an anchoring force to a mount including a support stud extending along a stud axis and depending from a force-distributing pad including a first side with a contact surface defined by a perimeter and adapted for supporting engagement with a support surface and a second side opposite the first side and including an anchoring-force bearing surface, the anchoring bracket comprising:

an elongated shank having first and seconds ends and an anchoring-force application region located between the first and second ends;

a first shank portion situated at least one of (a) at the first end of the shank and (b) between the first end and the anchoring-force application region of the shank, the first shank portion including an anchoring-force-exerting surface adapted for positioning into the interior of the pad perimeter for selective force-exerting engagement with the anchoring-force bearing surface of the pad; and a heel depending from a second shank portion more distant from the first end of the shank than the anchoring-force application region, the heel being adapted for selective force-exerting engagement with the support surface in a location exterior to the pad perimeter such that, when (i) the shank is oriented such that the force-exerting surface of the first shank portion is positioned for force-exerting engagement with the anchoring-force bearing surface of the mount pad and the heel is positioned for force-exerting engagement with the support surface outside the perimeter of the contact surface of the mount pad and (ii) an anchoring force directed toward the support surface is applied to the anchoring-force application region of the shank, the anchoring force is distributed to the heel and the first shank portion thereby urging the heel and the pad of the mount toward the support surface.

2. The anchoring bracket of claim 1 wherein the anchoring-force application region includes a fastener-receiving aperture adapted for receiving an elongated threaded rod fastener such that the fastener extends between the support surface and the anchoring-force application region and such that an anchoring force can be applied to the anchoring-force application region by threadably applying tension to the elongated threaded fastener, the fastener-receiving aperture being bounded by one of:

(i) a laterally closed boundary such that an elongated fastener is introduced into the fastener-receiving aperture along an axis extending through the fastener-receiving aperture; and (ii) a laterally open boundary that facilitates the lateral introduction of an elongated fastener into the fastener-receiving aperture.

3. The anchoring bracket of claim 1 wherein the first shank portion includes a stud-receiving aperture adapted for receiving the support stud of a mount to which an anchoring force is to be applied through the anchoring bracket, the stud-receiving aperture being bounded by one of:

(i) a laterally closed boundary such that a support stud is introduced into the stud-receiving aperture along an axis extending through the stud-receiving aperture; and (ii) a laterally open boundary that facilitates the lateral introduction of a support stud into the fastener-receiving aperture.

4. The anchoring bracket of claim 1 further comprising an elongated externally threaded fastener fixedly depending from the anchoring-force application region, the threaded fastener having a head end, by which it is joined to the anchoring-force application region, a second end opposite the head end and a set of external threads extending from the second end toward the head end, the fastener being adapted for introduction through a fastener-receiving bore extending through the support surface and a second surface of the support structure opposite the support surface such that at least a portion of the set of external threads protrudes with respect to the second surface so that the internal threads of an internally threaded fastener can be threaded onto the external threads of the externally threaded fastener until an anchoring force of desired magnitude is applied to the anchoring force application region through the threadable application of tension to the fixedly depending fastener.

5. An anchoring bracket for applying an anchoring force to a mount including a support stud extending along a stud axis and depending from a force-distributing pad including a first side with a contact surface defined by a perimeter and adapted for, supporting engagement with a support surface and a second side opposite the first side and including an anchoring-force bearing surface, the anchoring bracket comprising:

a base region including an anchoring-force-exerting surface adapted for selective force-exerting engagement with the anchoring-force bearing surface of the force-distributing pad of a mount; and at least two elongated shanks extending laterally outward from the base region, each shank having a base end and a distal end opposite the base end, each shank of a selected set of shanks having an anchoring-force application region located between the base and distal ends, a distal shank portion more distant from the base region than the anchoring-force application region and a heel depending from the distal shank portion, the heel being adapted for selective force-exerting engagement with the support surface in a location exterior to the pad perimeter of the mount such that, when (i) the anchoring-force exerting surface of the base region is positioned for force-exerting engagement with the anchoring-force bearing surface of the mount pad, and (ii) with respect to each shank of a selected set of shanks positioned such that the heel depending from that shank is positioned for force-exerting engagement with the support surface in a location exterior to the pad perimeter of the mount, an anchoring force directed toward the support surface is applied to the anchoring-force application region of that shank, the anchoring force is distributed to the heel of that shank and the base region thereby urging the heel and the force-distributing pad of the mount toward the support surface.

6. The anchoring bracket of claim 5 wherein at least one shank of the bracket includes an anchoring-force application region having a fastener-receiving aperture adapted for receiving an elongated threaded rod fastener such that the fastener extends between the support surface and the anchoring-force application region and such that an anchoring force can be applied to the anchoring-force application region by threadably applying tension to the elongated threaded fastener, the fastener-receiving aperture being bounded by one of:

(i) a laterally closed boundary such that an elongated fastener is introduced into the fastener-receiving aperture along an axis extending through the fastener-receiving aperture; and (ii) a laterally open boundary that facilitates the lateral introduction of an elongated fastener into the fastener-receiving aperture.

7. The anchoring bracket of claim 5 wherein the base region includes a stud-receiving aperture adapted for receiving the support stud of a mount to which an anchoring force is to be applied through the anchoring bracket, the stud-receiving aperture being bounded by one of:

(i) a laterally closed boundary such that a support stud is introduced into the stud-receiving aperture along an axis extending through the stud-receiving aperture; and (ii) a laterally open boundary that facilitates the lateral introduction of a support stud into the fastener-receiving aperture.

8. The anchoring bracket of claim 5 further comprising an elongated externally threaded fastener fixedly depending from the anchoring-force application region of at least one shank, the threaded fastener having a head end, by which it is joined to the anchoring-force application region, a second end opposite the head end and a set of external threads extending from the second end toward the head end, the fastener being adapted for introduction through a fastener-receiving bore extending through the support surface and a second surface of the support structure opposite the support surface such that at least a portion of the set of external threads protrudes with respect to the second surface so that the internal threads of an internally threaded fastener can be threaded onto the external threads of the externally threaded fastener until an anchoring force of desired magnitude is applied to the anchoring force application region through the threadable application of tension to the fixedly depending fastener.

* * * * *